April 9, 1935.  F. S. ROBINS  1,997,309
EXPANSIBLE BEARING PIN
Filed July 16, 1934
Fig. 1.
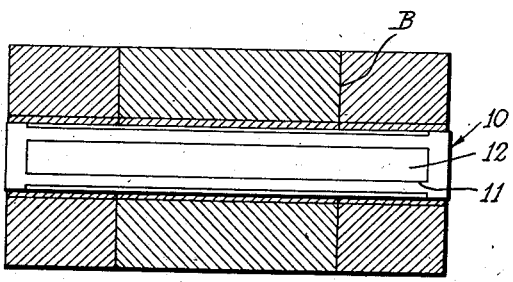
Fig. 2.
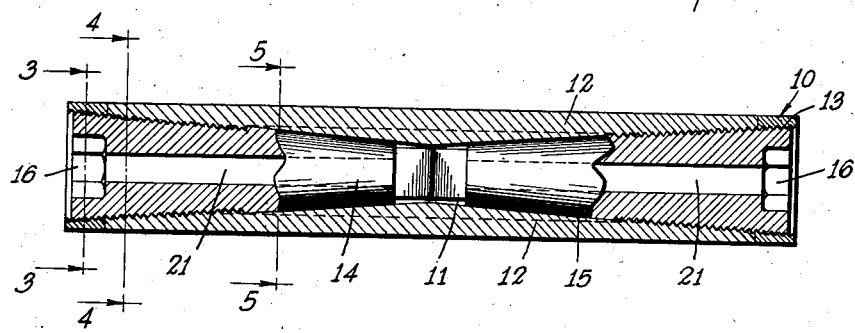
Fig. 3.  Fig. 4.  Fig. 5.
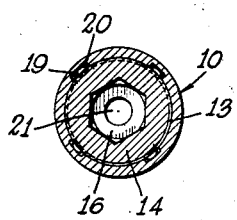 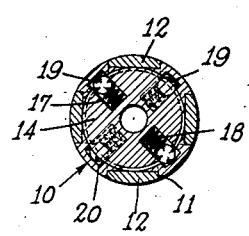
Inventor
F. S. Robins
by Hazard and Miller
Attorneys.

Patented Apr. 9, 1935

1,997,309

UNITED STATES PATENT OFFICE 1,997,309

EXPANSIBLE BEARING PIN

Fred S. Robins, Long Beach, Calif.

Application July 16, 1934, Serial No. 735,364

8 Claims. (Cl. 309—19)

This invention relates to improvements in bearing pins and, particularly, to bearing pins capable of being expanded so as to be caused to properly fit a bearing or bushing in which the bearing pin is disposed. The invention has been primarily designed for use as a wrist pin but may be employed in any situation where a pin is in a bearing or bushing and it is desired to cause the pin to properly fit either on initial installation or in taking up wear.

An object of the invention is to provide a bearing pin which is expansible with the parts so arranged as to be firmly seated on one another so as to be capable of withstanding stresses imposed on the bearing pin.

Another object of the invention is to provide an expansible bearing pin, such as a wrist pin, which is capable of being expanded at one end of the pin to a greater or less degree than at the other so that if one end of the bearing or bushing is larger than the other the bearing pin may be expanded in such a way as to properly fit it.

A further object of the invention is to provide a bearing pin, such as a wrist pin, which is not only expansible but in addition thereto provision is made for transmitting lubricant to the interior of the pin from which the lubricant may be distributed along the bearing surfaces.

With the foregoing and other objects in view, which will be made manifest in the following detailed description, and specifically pointed out in the appended claims, reference is had to the accompanying drawing for an illustrative embodiment of the invention, wherein:

Fig. 1 is a sectional view through an illustrative bearing showing the improved bearing in elevation and disposed therein.

Fig. 2 is a vertical section through the improved bearing pin.

Fig. 3 is a vertical, transverse section taken upon the line 3—3 upon Fig. 2.

Fig. 4 is a vertical, transverse section taken substantially upon the line 4—4 upon Fig. 2.

Fig. 5 is a vertical, transverse section substantially upon the line 5—5 upon Fig. 2.

Referring to the accompanying drawing, wherein similar reference characters designate similar parts throughout, the improved bearing pin consists of a tubular body generally designated at 10, preferably formed of seamless steel tubing, such as Shelby tubing. This body is cut to the length desired to form the complete bearing pin and its diameter closely approaches the internal diameter of the bearing or bushing in which the bearing pin is to be installed.

Longitudinal slots 11 are cut in the tubular body and while the number of these slots may vary, I have illustrated the body 10 as being provided with four of them. Expansible members 12 are provided which snugly fit between the sides and ends of the longitudinal slots 11 so as to have a free but snug sliding fit therein. These expansible members present outer surfaces conforming to the cylindrical outer surface of the tubular body 10. Their interior surfaces are transversely flat, as clearly shown in Figs. 4 and 5, but slope outwardly toward the ends of the body, as shown on Fig. 2. With the body and expanding members thus formed and assembled the body is internally threaded at its ends, as indicated at 13, with an inwardly tapering thread. These threads are cut not only in the body but may be partially formed on the interior transversely flat faces of the expanding members 12 extending along these members a short distance. The machine work being thus completed on the body and expanding members these members are then case hardened or otherwise hardened, and while the expanding members are held assembled with the body the exterior of the pin is ground so as to produce a smooth and truly cylindrical exterior surface. Expanding means are provided in the form of expanding pins indicated at 14 and 15 having tapered threads formed on their exteriors from their large ends inwardly so as to fit the tapered threads on the interior of the body at its ends and also the partial threads which may be formed on the inside faces of the expansible members 12 near their ends. The inner ends of these expanding pins are preferably left smooth and unthreaded and have a taper corresponding to the slope of the inner faces of the expansible members so as to fit thereagainst. In the preferred form of construction the outer ends of the expanding pins are formed with axial sockets 16 for the application of a wrench to rotatably adjust the expanding pins. Adjacent these sockets, small radial holes 17 may be formed in the pins receiving springs 18 and balls 19. The edges of these holes are peened over slightly so as to permanently retain the balls in the holes although permitting them to be partially projected therefrom by the springs. Longitudinal grooves 20 are formed across the threads and on the interior of the body extending inwardly from the ends of the body. The balls 19 are capable of partially entering these grooves and serve to lock or hold the expanding members in rotatably adjusted position.

In installing the bearing pin in a bearing B, the body with the associated segments or expansible members are bodily inserted in the bearing and upon the application of the socket wrench the expanding members 14 and 15 may be screwed inwardly. These force the expansible members outwardly of the body so as to snugly and closely fit the interior of the bearing. In the event that one end of the bearing is larger than the other the bearing pin may be caused to fit it by the screwing up of one expanding member a greater distance than the other. In the preferred form of construction the taper of the pins and the pitch of the threads thereon is such that each quarter turn of the expanding pins will create an expansion of the expanding members amounting to .001 inch in diameter. The rate of expansion on screwing in the expanding pins 14 and 15 may vary. Where the pin is used as a wrist pin connecting the pin to a connecting rod of an internal combustion engine, it is desirable to be able to lubricate the bearing from its ends. To this end axial bores 21 are formed in the expanding pins from end to end thereof for conveying lubricant to the center of the pin. This lubricant may be fed outwardly to the bearing surfaces between the expanding members 12 and the sides of the slots 11, or, if desired, an oil port, not shown, may be drilled in one of the webs 22 of the body between the slots.

From the above described construction it will be appreciated that the improved bearing pin is radially adjustable by means operable from the ends of the pin, which means are operable independently of each other, enabling the pin to be adjusted to fit a slightly tapered bearing if occasion should so require. The expansible members 12 have a solid bearing or backing against the sides of the expanding pins 14 and 15 except for the short space between the adjacent ends of the expanding pins 14 and 15, and as these center portions of the expansible members are the thickest this short, unsupported length is not detrimental. The ends of the expansible members which are thinnest are adequately supported or backed by the sides of the expanding pins. It will be appreciated that the construction is very easily manufactured and can be easily and quickly slipped into a bearing and caused to properly fit it.

While, due to the tapered pins having tapered threads fitting in tapered threads in the body, the length of adjustment is not great, the adjustment afforded by the construction is sufficient, under normal circumstances, to enable the bearing pin to be caused to properly fit a bearing.

Various changes may be made in the details of construction without departing from the spirit or scope of the invention as defined by the appended claims.

I claim:

1. An expansible bearing pin comprising a tubular body, there being longitudinally extending slots formed in the body extending from adjacent one end thereof to adjacent the other end but terminating inwardly of the ends of the body, expansible elements fitting the slots of the body, and means operable from the ends of the body for forcing the expansible elements outwardly.

2. An expansible bearing pin comprising a tubular body, there being longitudinally extending slots formed in the body extending from adjacent one end thereof to adjacent the other end but terminating inwardly of the ends of the body, expansible elements fitting the slots of the body, and means operable from each end of the body for forcing the expansible elements outwardly, said means being operable independently of each other.

3. An expansible bearing pin comprising a tubular body, there being longitudinally extending slots formed in the body extending from adjacent one end thereof to adjacent the other end but terminating inwardly of the ends of the body, expansible elements fitting the slots of the body, and tapered expanding members screwed into the ends of the body operable upon rotation to engage the interior surfaces of the expansible elements and force them outwardly.

4. An expansible bearing pin comprising a tubular body, there being longitudinally extending slots formed in the body extending from adjacent one end thereof to adjacent the other end but terminating inwardly of the ends of the body, expansible elements fitting the slots of the body, tapered expanding members screwed into the ends of the body operable upon rotation to engage the interior surfaces of the expansible elements and force them outwardly, and means for holding the expanding members in rotated adjusted position.

5. An expansible bearing pin comprising a tubular body, there being longitudinally extending slots formed in the body extending from adjacent one end thereof to adjacent the other end but terminating inwardly of the ends of the body, expansible elements fitting the slots of the body, and tapered expanding members screwed into the ends of the body operable upon rotation to engage the interior surfaces of the expansible elements and force them outwardly, the interior surfaces of the expanding members sloping outwardly from their centers toward the ends of the body.

6. An expansible bearing pin comprising a tubular body, there being longitudinally extending slots formed in the body extending from adjacent one end thereof to adjacent the other end but terminating inwardly of the ends of the body, expansible elements fitting the slots of the body, and tapered expanding pins having tapered threads screwed into the ends of the body, said tapered expanding pins fitting the interior surfaces of the expansible elements from their outer ends inwardly.

7. An expansible bearing pin comprising a tubular body, there being longitudinally extending slots formed in the body extending from adjacent one end thereof to adjacent the other end but terminating inwardly of the ends of the body, expansible elements fitting the slots of the body, and tapered expanding pins having tapered threads screwed into the ends of the body, said tapered expanding pins fitting the interior surfaces of the expansible elements from their outer ends inwardly, the tapered expanding pins having axial bores therethrough.

8. An expansible bearing pin comprising a tubular body, there being longitudinally extending slots formed in the body extending from adjacent one end thereof to adjacent the other end but terminating inwardly of the ends of the body, expansible elements fitting the slots of the body, tapered expanding pins having tapered threads screwed into the ends of the body, said tapered expanding pins fitting the interior surfaces of the expansible elements from their outer ends inwardly, the tapered expanding pins having axial bores therethrough, and means for locking the tapered expanding pins in adjusted position.

FRED S. ROBINS.